United States Patent
Urtiga et al.

(10) Patent No.: US 8,696,173 B2
(45) Date of Patent: Apr. 15, 2014

(54) LOW PROFILE LAMP USING TIR LENS

(75) Inventors: Lucas Urtiga, Montréal (CA); Eden Dubuc, St-Édouard (CA); Sebastien Magnan, Montréal (CA)

(73) Assignee: GE Lighting Solutions, LLC, Cleveland, OH (US)

( * ) Notice: Subject to any disclaimer, the term of this patent is extended or adjusted under 35 U.S.C. 154(b) by 151 days.

(21) Appl. No.: 13/155,562

(22) Filed: Jun. 8, 2011

(65) Prior Publication Data

US 2012/0313534 A1    Dec. 13, 2012

(51) Int. Cl.
*F21V 5/00* (2006.01)

(52) U.S. Cl.
USPC ........... 362/329; 362/327; 362/331; 362/332; 362/276

(58) Field of Classification Search
USPC ................... 362/246, 305, 235, 244
See application file for complete search history.

(56) References Cited

U.S. PATENT DOCUMENTS

| | | | | |
|---|---|---|---|---|
| 5,197,792 A * | 3/1993 | Jiao et al. | | 362/623 |
| 5,775,792 A | 7/1998 | Wiese | | |
| 6,097,549 A * | 8/2000 | Jenkins et al. | | 359/726 |
| 6,429,581 B1 | 8/2002 | Trentelman | | |
| 6,598,998 B2 * | 7/2003 | West et al. | | 362/307 |
| 6,814,470 B2 | 11/2004 | Rizkin et al. | | |
| 7,021,805 B2 * | 4/2006 | Amano et al. | | 362/518 |
| 7,181,378 B2 * | 2/2007 | Benitez et al. | | 703/2 |
| 7,454,119 B2 * | 11/2008 | Hsieh et al. | | 385/146 |
| 7,967,477 B2 * | 6/2011 | Bloemen et al. | | 362/299 |

FOREIGN PATENT DOCUMENTS

| | | |
|---|---|---|
| CN | 2332012 | 8/1999 |
| CN | 201335320 | 10/2009 |
| EP | 0 864 064 | 12/2002 |
| EP | 2 023 039 | 2/2009 |
| EP | 2 031 443 | 3/2009 |
| EP | 2 081 079 | 7/2009 |
| JP | 02301000 | 12/1990 |
| WO | WO 2004/104642 A2 | 12/2004 |
| WO | WO 2004/104642 A3 | 12/2004 |
| WO | WO 2010/030898 | 3/2010 |

* cited by examiner

*Primary Examiner* — Ali Alavi

(74) *Attorney, Agent, or Firm* — Fay Sharpe LLP

(57) ABSTRACT

A lamp is provided which is suitable for use in low-profile applications. The lamp includes a light source and a lens. The lens includes a first surface opposite a second surface, where the second surface includes an injection surface and the first surface includes a multi-faceted optical element converging towards the injection surface. The light source injects light into the lens via the injection surface and the light refracts through the first surface while total internally reflecting off the first surface and the second surface toward the periphery of the lens.

20 Claims, 4 Drawing Sheets

LOW PROFILE LAMP USING TIR LENS

BACKGROUND

The present exemplary embodiments relate generally to lighting. They find particular application in conjunction with low profile lamps, and will be described with particular reference thereto. However, it is to be appreciated that the present exemplary embodiments are also amenable to other like applications.

A lamp generally includes one or more light sources which may degrade over time and/or with temperature. However, lamps often lack the ability to compensate for and/or provide notice of such degradation. As a result, a lamp may not operate according to specification and/or provide an operator of the lamp with sufficient notice to replace the lamp before failure.

Further, a lamp generally includes a light emitting face through which light from the one or more light sources is emitted. Typically, it is preferable that light be uniformly emitted from the light emitting face. However, a light emitting face of a lamp is often larger than the light source. As such, uniform distribution of light emitted from the light source can be difficult to achieve.

One option includes the use of a catadioptric optical system. A catadioptric optical system uses refraction and reflection, usually via lenses (dioptrics) and curved mirrors (catoptrics), to focus light. However, one problem with using a catadioptric optical system is that catadioptric optical systems are generally fairly thick. Therefore, in instances where a low profile lamp is required, it is often difficult to make use of a catadioptric optical system.

Another option involves using a matrix of light sources spread along the light emitting face of a lamp. Such an option does not rely on an optical system to distribute light from a light source across a light emitting face of a lamp. Rather, it relies on sheer quantity of light sources. However, one problem with using a matrix is that increasing the quantity of light sources adds unnecessary expense, inefficiency, and complexity to a lamp.

The present disclosure contemplates new and improved systems and/or methods for remedying this and other problems.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one aspect of the present disclosure, a lamp is provided. The lamp includes a light source and a lens. The lens includes a first surface opposite a second surface, where the second surface includes an injection surface and the first surface includes a multi-faceted optical element converging towards the injection surface. The light source injects light into the lens via the injection surface. This light refracts through the first surface while total internally reflecting off the first surface and the second surface toward the periphery of the lens.

According to another aspect of the present disclosure, a lamp is provided. The lamp includes a light source, a light sensor, and a power supply. The power supply controls light output of the light source based on measured light output from the light sensor. The lamp further includes a lens, where the lens includes a light emitting face. The lens is configured to receive light emitted from the light source and uniformly distribute the received light across the light emitting face using total internal reflection and refraction. The light sensor is disposed on the light emitting face of the lens.

According to another aspect of the present disclosure, a lens is provided. The lens includes a first surface opposite a second surface, where these surfaces define a waveguide channel. Light directed to the first surface and/or the second surface total internally reflects to a periphery of the lens. The lens further includes an injection surface receiving light from a light source and a multi-faceted optical element opposite the injection surface. The multi-faceted optical element converges toward the injection surface, where light received by the injection surface total internally reflects off the multi-faceted optical element to the periphery of the lens.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
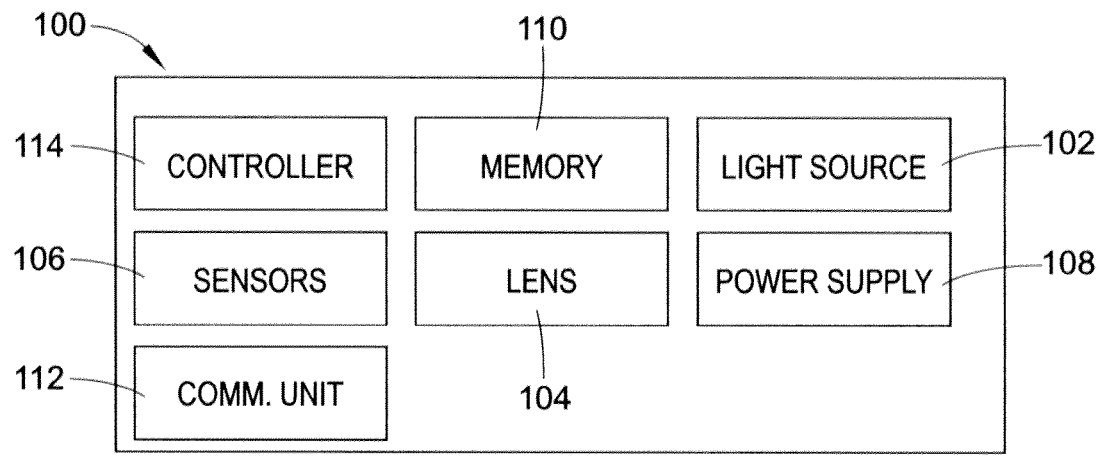
FIG. 1 is a block diagram of a lamp according to aspects of the present disclosure.

One or more embodiments or implementations are hereinafter described in conjunction with the drawings, where like reference numerals are used to refer to like elements throughout, and where the various features are not necessarily drawn to scale.

With reference to FIG. 1, a block diagram of a lamp 100 according to aspects of the present disclosure is provided. The lamp 100 may, for example, be a traffic lamp, a lamp employed by the backlight of certain watches, and the like. The lamp 100 may include one or more of a light source 102, a lens 104, one or more sensors 106, a power supply 108, a memory 110, a communications unit 112, a controller 114, and the like.

The light source 102 suitably generates light for the lamp 100. The light source 102 may include one or more types such as guided light (e.g., light guided from optical fibers or other types of light guides); direct electric-powered light emitters (single or cluster), such as electroluminescent sources (LEDs, organic LEDs, polymer LEDS, etc.), gas discharge sources (fluorescent, plasma, etc.), high-intensity discharge sources, lasers, non-linear light sources; and the like. The light source 102 may be selected to control Correlated Color Temperature (CCT), Color Rendering Index (CRI), and other like characteristics of light.

The lens 104 suitably distributes light from the light source 102 uniformly across a light emitting face of the lamp 100. As discussed in greater detail below, this may be achieved using a positive lens that works partially on refraction and partially on total internal reflection. In certain embodiments, the lens 100 may occupy at least half the light emitting face and/or the light source 102 may be positioned away from the lens 104 less than ¼ of the radius or focal length of the lens 102. Further, in certain embodiments, the lens may be treated to increase uniformity, improve lit appearance, and/or reduce glare. Additionally or alternatively, another optical component, such as a diffusing film, may be used to achieve a similar affect.

The sensors 106 suitably measure one or more operating conditions of the lamp 100. Operating conditions may include one or more of input voltage, operating temperature, output current and/or voltage to the light source 102, light output of the light source 102, and the like. In certain embodiments, the sensors 106 may include a photo-electric transducer, such as a solid-state photo-detector. In such embodiments, the photoelectric transducer can be connected to any surface of the lens 104. However, a surface with less impact on the optical performance of the lens 104, typically an outer surface, is preferable. In certain embodiments, the sensors 106 may additionally or alternatively include a thermistor.

The power supply 108 suitably receives power from an external power source (not shown) and distributes the power to the constituent components of the lamp 100. The input voltage of the received power may be an alternating current (AC) voltage or a direct current (DC) voltage. In certain embodiments, the power supply 108 may receive commands from the controller 114 and/or an external device (not shown), controlling the distribution of the power. For example, the power supply 108 may receive commands from the controller 114 instructing the power supply 108 as to the output current and/or voltage to provide to the light source 102. In other embodiments, the power supply 108 may receive a signal from the sensors 106, such as the photo-electric transducer, and adjust the output current and/or voltage to the light source 102 to maintain a constant light output.

The power supply 108 suitably includes one or more hardware components for distribution of the power to the lamp 100. For example, the power supply 108 may include one or more of a rectifier, surge protection circuit, an electromagnetic interference circuit, a switching power supply, a conflict monitor, a fuse, a fuse blowout (FBO) circuit, a power factor correcting power supply, and the like. However, other components, such as software components, are equally amenable.

The memory 110 suitably stores log data associated with one or more operating conditions in a stateful manner. For example, the memory 110 may store the operating time of the traffic lamp 100. The memory 110 may include one or more of a magnetic disk or other magnetic storage medium; an optical disk or other optical storage medium; a random access memory (RAM), read-only memory (ROM), or other electronic memory device or chip or set of operatively interconnected chips; and the like.

The communications unit 112 suitably provides the controller 114 with an interface from which to communicate with other lamps and/or components external to the lamp 100. For example, the communications unit 112 may allow the lamp 100 to receive commands from an external controller (not shown). The communications unit 112 may communicate with these other lamps and/or components external to the lamp 100 via, for example, a communications network, such as a local area network, wide area network, the Internet, and so on, and/or a data bus, such as I2C, universal serial bus, serial, and so on.

The controller 114 suitably monitors operating conditions of the lamp 100. Monitoring may include receiving data pertaining to one or more operating conditions of the lamp 100 from one or more hardware and/or software components comprising the lamp 100, such as the sensors 106. The received data may include the present values of operating conditions and/or data necessary to calculate the present values of operating conditions. Monitoring may further include calculating values for one or more operating conditions from the received data and/or determining whether the operating conditions are within acceptable limits based on this received data. As to the determination, values for operating conditions (whether calculated or directly measured) may be compared against thresholds and/or expected values for the operating conditions. If an operating condition falls outside acceptable limits a fault is detected.

In certain embodiments, the controller 114 may instruct the power supply 108 as to the output current and/or voltage to provide to the light source 102, so as to account for degradation factors, while monitoring operating conditions of the lamp 100. Degradation factors reduce the light output of the light source 102 and may include one or more of operating time of the light source 102, operating temperature of the lamp 100, and the like. The controller 114 may adjust the power supply output current and/or voltage on the basis of light output of the light source 102 as determined by one of the sensors 106, such as the photo-electric transducer. Alternatively, the controller 114 may adjust the power supply output current and/or voltage on the basis of a calculated output current and/or voltage.

A calculated power supply output $I_{out}$ may be defined as:

$$I_{out} = I_{nom} * f_{TH} * f_{De}, \qquad (1)$$

where $I_{nom}$ is the nominal output current to the light source 102, $f_{TH}$ is a correction factor adjusting for temperature inside the lamp 100, and $f_{De}$ is a correction factor adjusting for the age of the light source 102. The correction factors may be determined through the use of one or more lookup tables in which correction factors are indexed by present values of operating conditions. A calculated output voltage $V_{out}$ can similarly be calculated.

In certain embodiments, the controller 114 may log operating conditions of the lamp 100 while monitoring operating conditions of the lamp 100. The process of logging operating conditions of the lamp 100 may include writing values (calculated or otherwise) of one or more of the operating conditions to the memory 110. The values of operating conditions may overwrite previously written log data and/or be written as a log entry indexed by time. Logging may be performed when one or more of the operating conditions are determined to fall outside acceptable limits (i.e., a fault is detected). However, other triggers for logging are equally amenable. For example, logging may be performed at periodic intervals as determined by, for example, a timer of the lamp 100. As another example, logging may be performed right before the lamp 100 goes into an OFF state.

In certain embodiments, the controller 114 may generate an indication if a fault is detected while monitoring operating conditions of the lamp 100. For example, if the operating temperature and/or operating time of the lamp 100 exceed certain thresholds the controller 114 may generate an indication. The indication may include generating an indication signal. The indication signal may be provided to a local component of the lamp 100 and/or an external component thereof.

Further, the indication signal may be used for one or more of generating an audio and/or visual warning, flashing one or more light sources, enabling a fault light source, and the like.

The controller 114 may include a digital/electronic processor, such as a microprocessor, microcontroller, graphic processing unit (GPU), and the like. In such embodiments, the controller 114 suitably executes instructions stored on a memory. In certain embodiments, the memory may be the memory 110 of the lamp 100. In other embodiments, the memory may be local to the controller 114 and one of ROM, EPROM, EEPROM, Flash memory, and the like. The controller 114 may communicate with the memory 110 of the lamp 100 via a digital communications protocol, such as I2C, USB, RS-232, RS-485, 1 Wire, SPI, WiFi, and the like. However, analog communications protocols are equally amenable. The communications protocol may be carried over one or more of a data bus, a communications network, and the like.

Figure 2:
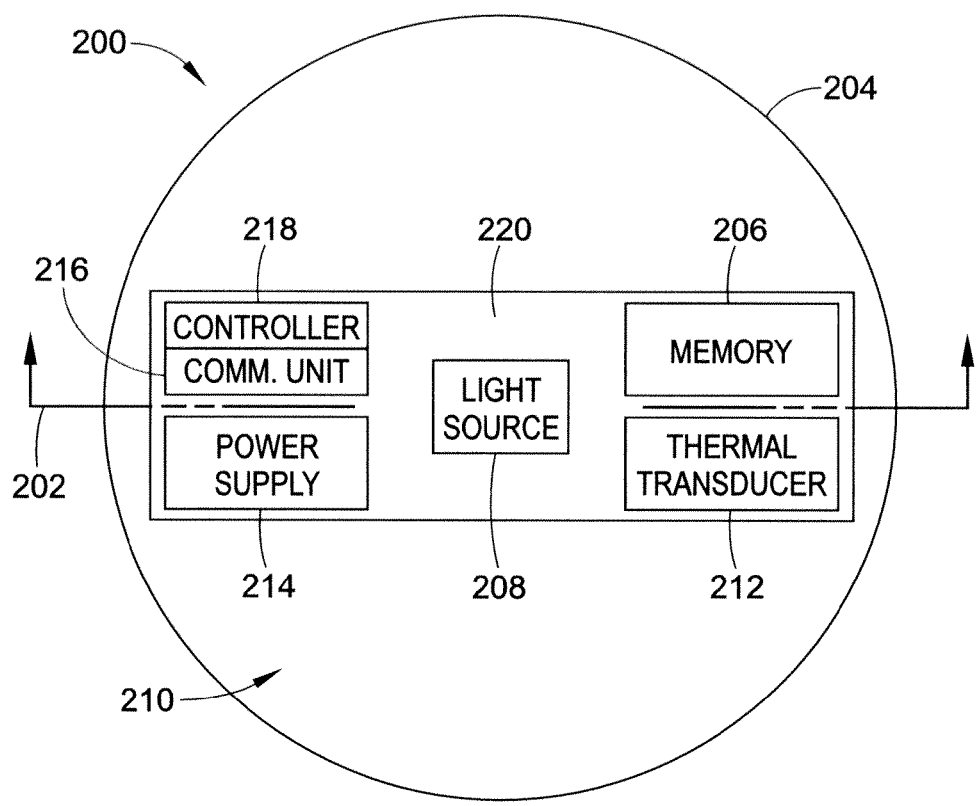
FIG. 2 is a top plane view of a lamp according to aspects of the present disclosure.
Figure 3:
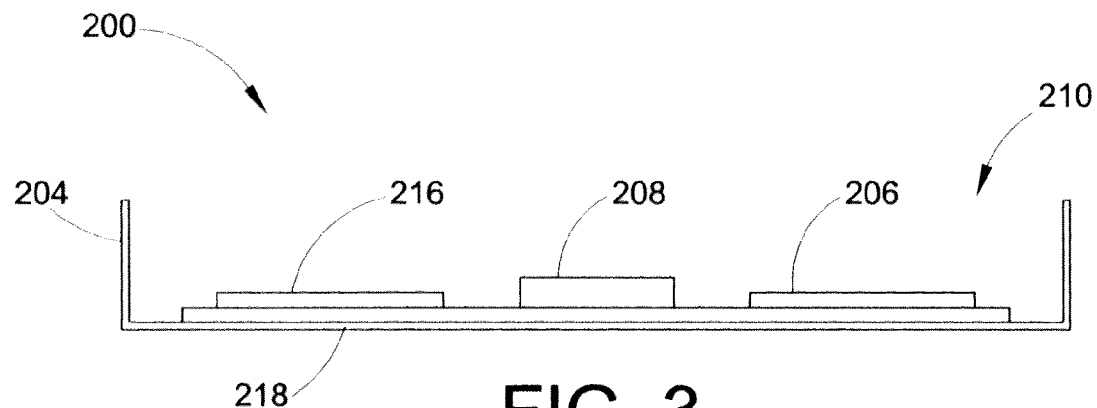
FIG. 3 is cross sectional view of the lamp of FIG. 2.

With reference to FIGS. 2 and 3, a lamp 200 according to aspects of the present disclosure is provided. FIG. 2 provides a top plane view of the lamp 200 and FIG. 3 provides a cross sectional view of the lamp 200 along line 202. The lamp 200 is a more specific embodiment of the lamp 100 of FIG. 1. Therefore, the discussion heretofore is equally amenable to the discussion to follow and components described hereafter are to be understood as paralleling like components discussed heretofore, unless noted otherwise. The lamp 200 may include one or more of a housing 204, a memory 206, a light source 208, a light emitting face 210, a lens (not shown), one or more sensors 212, a power supply 214, a communications unit 216, a controller 218, a circuit board 220, and the like.

The housing 204 suitably defines the body of the lamp 200. The housing 204 may provide a mounting structure and/or protection for components of the lamp 200. Further, the housing 204 may be formed from one or more of a polymeric material, a metallic material, and the like. In certain embodiments, the housing 204 may act as a heat sink to draw heat away from the components of the lamp 200.

The memory 206 suitably stores log data associated with one or more operating conditions in a stateful manner. For example, the memory 206 may store the operating time of the traffic lamp 200. The memory 206 may include one or more of a magnetic disk or other magnetic storage medium; an optical disk or other optical storage medium; a random access memory (RAM), read-only memory (ROM), or other electronic memory device or chip or set of operatively interconnected chips; and the like.

The light source 208 suitably generates light for the lamp 200. The light source 208 may include one or more of guided light, such as light guided from optical fibers or other types of light guides; direct electric-powered light emitters (single or cluster), such as electroluminescent sources (LEDs, organic LEDs, polymer LEDS, etc.), gas discharge sources (fluorescent, plasma, etc.), high-intensity discharge sources, lasers, non-linear light sources, and the like. The light source 208 may be selected to control Correlated Color Temperature (CCT), Color Rendering Index (CRI), and other like characteristics of light.

The light emitting face 210 suitably corresponds to the portion of the lamp 200 out of which light from the light source 208 is emitted. Put another way, the light emitting face 210 may be viewed as the boundary through which light from the light source 208 passes to get to the external environment of the lamp 200. In certain embodiments, the light emitting face 210 and the light emitting face of the lens may be one and the same.

The lens suitably uniformly distributes light from the light source 208 across the light emitting face 210 of the lamp 200. As discussed in detail below, this may be achieved using a positive lens that works partially on refraction and partially on total internal reflection. In certain embodiments, the lens may occupy at least half the light emitting face 210 and/or the light source 208 may be positioned away from the lens less than ¼ of the radius of the lens. Further, in certain embodiments, the lens may be treated to at least one of increase uniformity, improve lit appearance, and reduce glare. Additionally or alternatively, another optical component, such as a diffusing film, may be used to achieve a similar affect.

The sensors 212 suitably measure one or more operating conditions of the lamp 200. Operating conditions may include one or more of input voltage, operating temperature, output current to the light source 208, light output of the light source 208, and the like. The sensors 212 may include, for example, one or more of a photo-electric transducer (not shown), such as a solid-state photo-detector, a thermal-electric transducer (shown), such as a thermistor, and the like. In certain embodiments, the photo-electric transducer is disposed on the light emitting face of the lens.

The power supply 214 suitably receives power from an external power source (not shown) and distributes the power to the constituent components of the lamp 200. In certain embodiments, the power supply 214 may receive commands from the controller 216 and/or an external device (not shown), controlling the distribution of the power. For example, the power supply 214 may receive commands from the controller 216 instructing the power supply 214 as to the output current to provide to the light source 208.

The communications unit 216 suitably provides the controller 218 with an interface from which to communicate with other lamps and/or components externals to the lamp 200. The communications unit 216 may communicate with these other lamps and/or components external to the lamp 200 via, for example, a communications network, such as a local area network, wide area network, the Internet, and so on, and/or a data bus, such as I2C, universal serial bus, serial, and so on.

The controller 218 suitably monitors operating conditions of the lamp 200. In certain embodiments, the controller 218 may instruct the power supply 214 as to the output current to provide to the light source 208, so as to account for degradation factors, while monitoring operating conditions of the lamp 200. Degradation factors reduce the light output of the light source 208 and may include one or more of operating time of the light source 208, operating temperature of the lamp 200, and the like. In other embodiments, the controller 218 may additionally or alternatively log operating conditions, such as operating time, of the lamp 200 to the memory 206 while monitoring operating conditions of the lamp 200. In other embodiments, the controller 218 may additionally or alternatively generate an indication if a fault is detected while monitoring operating conditions of the lamp 200. The indication may include generating an indication signal, which may be used to generate an audio and/or visual notification.

The circuit board 220 suitably provides a mounting point for one or more of the controller 218, the communications unit 216, the power supply 214, the light source 208, the memory 206, one or more of the sensors 212, and the like. Further, the circuit board 220 suitably interconnects the components electrically. In certain embodiments, the circuit board 220 may act as a heat sink for components mounted thereon and/or include a metal core printed circuit board. The circuit board 220 may mount to the housing 204 of the lamp 200 by, for example, mechanical fasteners, glue, tape, epoxy, and the like.

Figure 4:
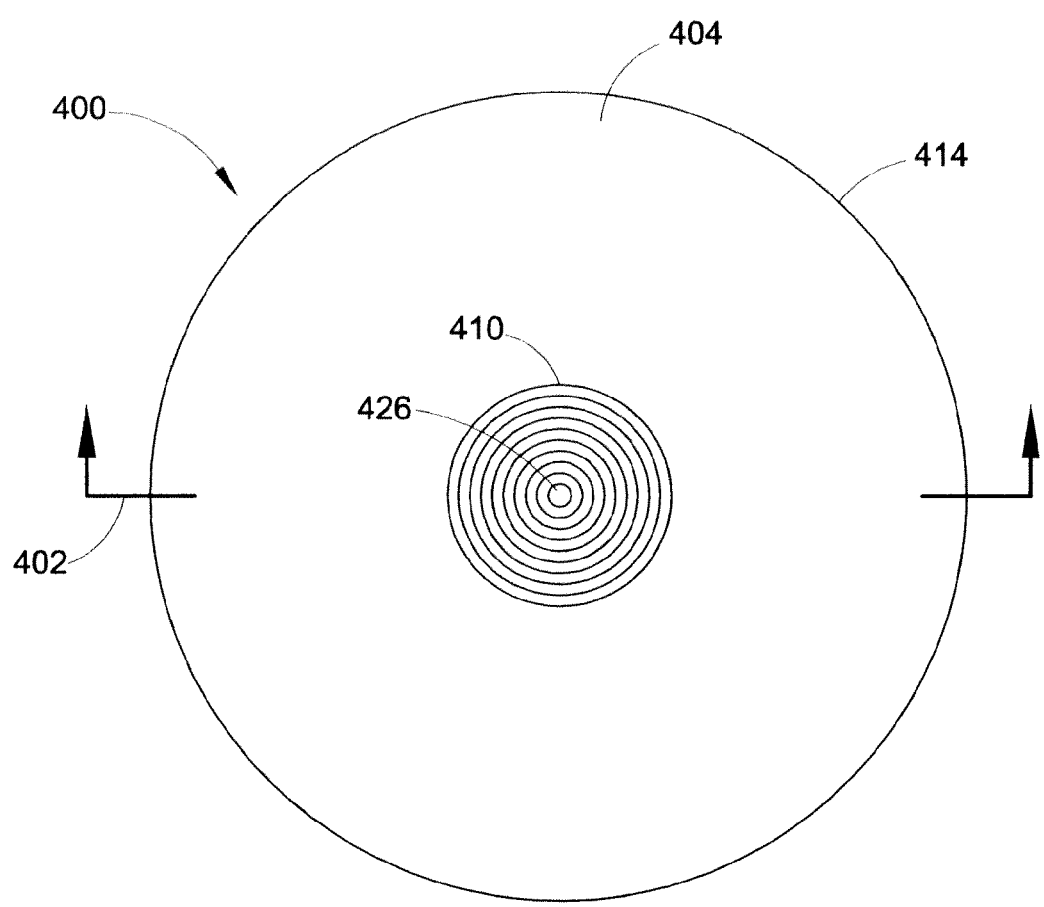
FIG. 4 is a top plane view of a revolved lens according to aspects of the present disclosure.
Figure 5:
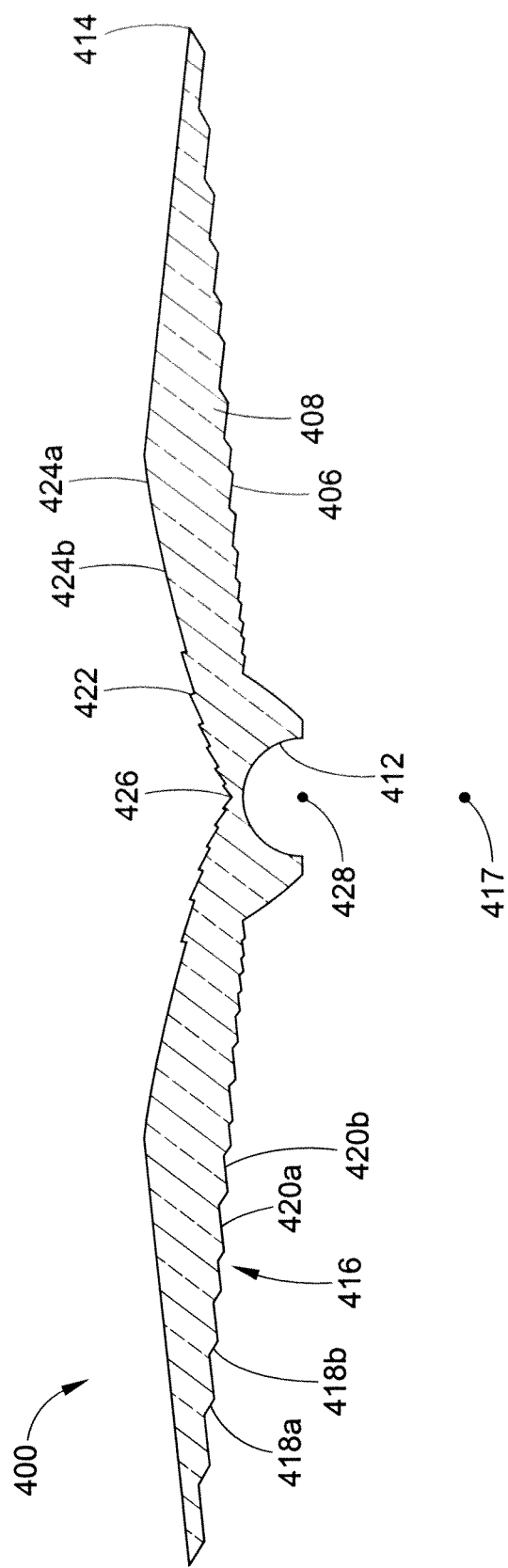
FIG. 5 is a cross sectional view of the lens of FIG. 4.

With reference to FIGS. 4 and 5, a revolved lens 400 according to aspects of the present disclosure is provided. FIG. 4 provides a top plane view of the lens 400, and FIG. 5 provides a cross sectional view of the lens 400 along line 402. The lens 400 is suitably employed within a lamp, such as the lamp 100 of FIG. 1 and/or the lamp 200 of FIGS. 2 and 3.

The lens 400 may include one or more of a first surface 404, a second surface 406, a waveguide channel 408, a multi-faceted optical element 410, an injection surface 412, and the like. As the lens 400 is oriented in FIG. 5, the first surface 404 may be viewed as the top surface of the lens 400, and the second surface 406 may be viewed as the bottom surface of the lens 400. Further, it is to be appreciated that the first surface 404 and the second surface 406 need not be continuous. For example, as shown, the first surface 404 includes the multi-faceted optical element 410 and the second surface includes the injection surface 412.

The first surface 404 and the second surface 406 suitably interact to define the waveguide channel 408, which may distribute light to the periphery 414 of the lens 400 using total internal reflection. Light suitably refracts through the first surface 404 as it travels to the periphery 414 of the lens 400 via the waveguide channel 408. In certain embodiments, the light may travel along a line greater than a critical angle for total internal reflection with respect to the first surface 404 and/or the second surface 406. Further, in certain embodiments, the outer edges of the first surface and the second surface may be coincident.

Light directed towards the first surface 404 suitably partially reflects off the first surface 404 towards the second surface 406. Reflection suitably employs both total internal reflection and simple reflection. Further, light directed towards the first surface 404 suitably partially refracts through the first surface 404. In that regard, it is to be appreciated that the first surface 404 defines the light emitting face of the lens 400. In certain embodiments, the first surface 404 may include a diffusing treatment to increase uniformity.

Light directed towards the second surface 406 suitably reflects off the second surface 406 towards the first surface 404. Reflection suitably employs both total internal reflection and simple reflection. So as to facilitate reflection, the second surface 406 suitably includes a plurality of converging facets, such as a first facet 416. Suitably, the converging facets, in conjunction with the multi-faceted optical element 410, are configured to simulate a focal point 417 different than that of the position of the light source. The converging facets may include a plurality of optical surfaces, such as optical surfaces 418, and a plurality of non-optical surfaces, such as non-optical surfaces 420. The optical surfaces, in contrast with the non-optical surfaces, may redirect light directed thereto to the first surface 404, typically via total internal reflection.

The multi-faceted optical element 410 suitably reflects and refracts light directed thereto. Reflection includes total internal reflection and/or simple reflection. For example, the multi-faceted optical element 410 may total internally reflect a portion of light directed thereto to the second surface 406 and/or the first surface 404 and refract the remainder of light directed thereto away from the lens 400. To do so, the multi-faceted optical element 410 suitably includes a plurality of cusps formed from a plurality of optical surfaces, such as optical surfaces 424, and a plurality of non-optical surfaces, such as non-optical surfaces 422. Light directed to the multi-faceted optical element 410 typically refracts through the non-optical surfaces, and reflects, typically using total internal reflection, off the optical surfaces towards the second surface 406.

The multi-faceted optical element 410 may converge towards the second surface 406 and/or be configured in a Fresnel way. The multi-faceted optical element 410 may, but need not, be centrally located within the lens 400 and/or aligned with the center of a light source used in conjunction with the lens 400. Putting the latter another way, the point of convergence 426 of the multi-faceted optical element 410 may be aligned with the center of the light source. Suitably, the facets are configured to simulate the focal point 417 different than that of the position of the light source.

The injection surface 412 suitably acts as the receiving area of the lens 400 for light emitted by a light source used in conjunction with the lens 400. The injection surface 412 may receive light emitted by a light source 428 placed within 25% of the simulated focal distance of the lens 400 for the simulated focal point 417. Further, the injection surface 412 may include a spherical surface, where a light source is positioned in the center thereof. In certain embodiments, the injection surface 412 may include no optical power.

Figure 6:
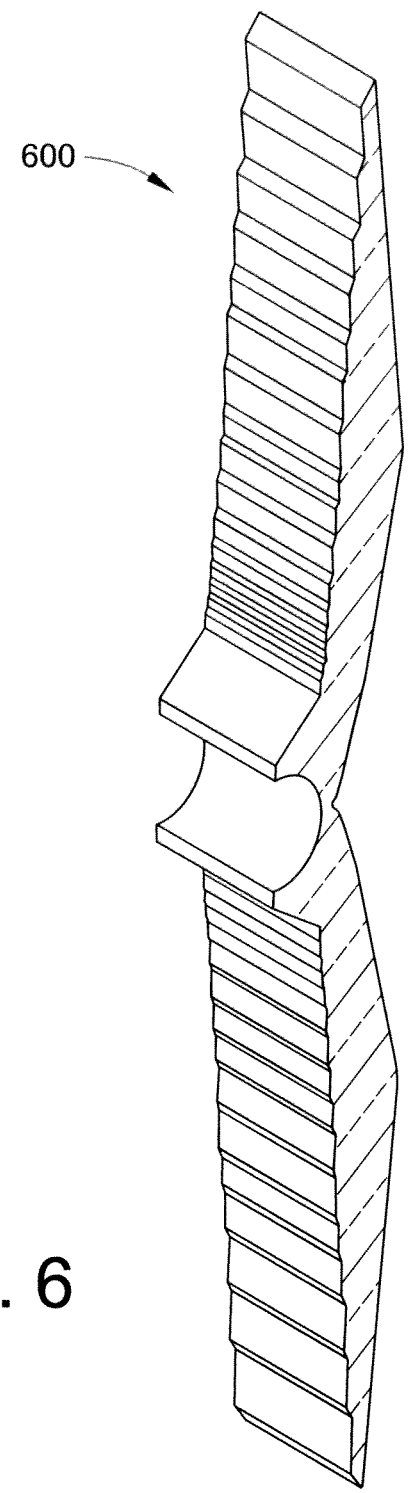
FIG. 6 is an extruded lens according to aspects of the present disclosure.

With reference to FIG. 6, a perspective view of an extruded lens 600 according to aspects of the present disclosure is provided. The lens 600 is suitably employed within a lamp, such as the lamp 100 of FIG. 1. As with the lens 400 of FIGS. 4 and 5, the lens 600 makes use of a combination of total internal reflection and refraction to uniformly distribute light from a light source across a light emitting face. Further, the cross section of the extruded lens 600 is the same as the cross sectional view of the lens 400 of FIG. 5, whereby it is to be appreciated that the lens 600 operates as described in connection with the lens 400 of FIGS. 4 and 5. Therefore, in lieu of repeating the discussion of the lens 400 of FIGS. 4 and 5, attention is directed to the discussion of the lens 400 of FIGS. 4 and 5 above.

The disclosure has been made with reference to preferred embodiments. Obviously, modifications and alterations will occur to others upon reading and understanding the preceding detailed description. It is intended that the preferred embodiments be construed as including all such modifications and alterations insofar as they come within the scope of the appended claims or the equivalents thereof.

The invention claimed is:

1. A lamp comprising:
   a light source; and
   a lens including a first surface opposite a second surface, said second surface including an injection surface and said first surface including a multi-faceted optical element converging towards the injection surface, wherein said light source injects light into the lens via the injection surface, wherein said injected light refracts through the first surface while total internally reflecting off the first surface and the second surface toward the periphery of the lens.

2. The lamp of claim 1, wherein the first surface includes a diffusing treatment.

3. The lamp of claim 1, wherein the first surface and the second surface are coincident at the periphery of the lens.

4. The lamp of claim 1, wherein the second surface includes a plurality of converging facets facilitating total internal reflection of light toward the periphery of the lens.

5. The lamp of claim 4, wherein the converging facets simulate a focal point farther from the lens than the light source.

6. The lamp of claim 1, wherein the multi-faceted optical element is aligned with a center of the light source.

7. The lamp of claim 1, further comprising:
   a lighting emitting surface, wherein said lens occupies a majority of the lighting emitting surface.

8. The lamp of claim 1, wherein the light source is positioned a distance less than ¼ of a simulated focal length of the lens.

9. The lamp of claim 1, wherein the lens is generated by extrusion and/or revolving.

10. The lamp of claim 1, wherein the injected light travels to a periphery of the lens along a line greater than a critical angle for total internal reflection with respect to said first surface and/or said second surface.

11. A lamp comprising:
a light source and a light sensor;
a power supply controlling light output of the light source based on measured light output from the light sensor; and
a lens including a light emitting face, said lens configured to receive light emitted from the light source and uniformly distribute said received light across the light emitting face using total internal reflection and refraction, wherein said light sensor is disposed on the light emitting face of the lens.

12. The lamp of claim 11, wherein the light sensor is a photo-electric transducer.

13. The lamp of claim 11, further comprising:
a controller monitoring light output of the light source using the light sensor and correcting for degradation in light output of the light source using the light sensor.

14. The lamp of claim 13, wherein the controller corrects for degradation in light output of the light source by instructing the power supply as to output current to provide to the light source.

15. The lamp of claim 11, wherein the lens includes a first surface and a second surface defining a waveguide channel, wherein the received light total internally reflects along the waveguide to a periphery of the lens.

16. The lamp of claim 15, wherein the first surface includes a multi-faceted optical element and the second surface includes an injection surface, wherein said multi-faceted optical element converges towards the injection surface, wherein said lens receives light from the light source via the injection surface.

17. The lamp of claim 11, wherein the received light refracts through the first surface while total internally reflecting to the periphery of the lens.

18. A lens comprising:
a first surface opposite a second surface defining a waveguide channel, wherein the first surface and/or the second surface total internally reflect light directed thereto to a periphery of the lens;
an injection surface receiving light from a light source; and
a multi-faceted optical element opposite the injection surface, said multi-faceted optical element converging towards the injection surface, wherein light received by the injection surface total internally reflects off the multi-faceted optical element to the periphery of the lens.

19. The lens of claim 18, wherein the second surface includes a plurality of converging facets.

20. The lens of claim 18, wherein light refracts out the first surface as it travels along the waveguide channel to the periphery of the lens.

* * * * *